United States Patent
Gestner et al.

(10) Patent No.: US 11,243,105 B2
(45) Date of Patent: Feb. 8, 2022

(54) FLOW METER CONFIGURATION AND CALIBRATION

(71) Applicant: StreamLabs, Inc., Whitehouse Station, NJ (US)

(72) Inventors: Brian Gestner, Atlanta, GA (US); Francis M. Mess, Smyrna, GA (US); Jeffrey L. Leaders, Mableton, GA (US)

(73) Assignee: StreamLabs, Inc., Whitehouse Station, NJ (US)

( * ) Notice: Subject to any disclaimer, the term of this patent is extended or adjusted under 35 U.S.C. 154(b) by 206 days.

(21) Appl. No.: 15/531,332

(22) PCT Filed: Aug. 26, 2016

(86) PCT No.: PCT/US2016/048944
§ 371 (c)(1),
(2) Date: May 26, 2017

(87) PCT Pub. No.: WO2017/040267
PCT Pub. Date: Mar. 9, 2017

(65) Prior Publication Data
US 2018/0335330 A1    Nov. 22, 2018

Related U.S. Application Data

(60) Provisional application No. 62/211,607, filed on Aug. 28, 2015.

(51) Int. Cl.
*G01F 1/66* (2006.01)
*G01F 25/00* (2006.01)
(Continued)

(52) U.S. Cl.
CPC ............... *G01F 1/666* (2013.01); *G01F 1/66* (2013.01); *G01F 1/662* (2013.01); *G01F 1/667* (2013.01);
(Continued)

(58) Field of Classification Search
None
See application file for complete search history.

(56) References Cited

U.S. PATENT DOCUMENTS 3,922,911 A * 12/1975 Groves ............... A61B 8/06
                                                    73/861.25
4,391,149 A    7/1983 Herzl
(Continued)

FOREIGN PATENT DOCUMENTS

EP     2 759 846 A2    7/2014
JP     2012-052994 A    3/2012
WO    WO-2012/129101 A1    9/2012

OTHER PUBLICATIONS

Brennan et al.; "On the relationship between time and frequency domain methods in time delay estimation for leak detection in water distribution pipes"; Journal of Sound and Vibration; vol. 304, Issues 1-2, Jul. 10, 2007, pp. 213-223. (Year: 2007).*

(Continued)

*Primary Examiner* — Catherine T. Rastovski
*Assistant Examiner* — Leonard S Liang
(74) *Attorney, Agent, or Firm* — Fish & Richardson P.C.

(57) ABSTRACT

Methods and systems for configuring a fluid flow meter include a processor obtaining a measurement signal recorded by the fluid flow meter. The processor can determine a whitening frequency band. The processor can then construct a whitening filter based on the measurement signal and the whitening frequency band. The processor can then generate a reference signal based on the whitening filter and the measurement signal. The processor can provide the whitening filter and the reference signal for use by the fluid flow meter to measure a time shift between the reference signal and another measurement signal.

20 Claims, 9 Drawing Sheets

(51) Int. Cl.
  *G01F 15/02* (2006.01)
  *G01F 1/74* (2006.01)
(52) U.S. Cl.
  CPC .......... *G01F 1/668* (2013.01); *G01F 25/0007* (2013.01); *G01F 25/0038* (2013.01); *G01F 1/663* (2013.01); *G01F 1/665* (2013.01); *G01F 1/74* (2013.01); *G01F 15/024* (2013.01)

(56) References Cited

U.S. PATENT DOCUMENTS

| | | | | |
|---|---|---|---|---|
| 5,170,792 | A * | 12/1992 | Sturgill | A61B 8/488 600/455 |
| 5,907,104 | A * | 5/1999 | Cage | G01F 25/0007 73/861.355 |
| 6,877,387 | B1 * | 4/2005 | Gerton | G01F 1/712 73/861.29 |
| 9,252,745 | B2 * | 2/2016 | Shimizu | H03H 17/0255 |
| 10,031,011 | B2 * | 7/2018 | Ferencz | G01F 1/66 |
| 2002/0095263 | A1 * | 7/2002 | Gysling | G01F 1/712 702/45 |
| 2007/0006744 | A1 * | 1/2007 | Gysling | G01F 1/36 99/486 |
| 2007/0156355 | A1 | 7/2007 | Hishida et al. | |
| 2007/0169536 | A1 * | 7/2007 | Cotton | G01F 1/667 73/1.16 |
| 2007/0169537 | A1 * | 7/2007 | Cotton | G01F 1/667 73/1.27 |
| 2007/0291591 | A1 * | 12/2007 | Peng | G01S 15/104 367/101 |
| 2008/0133182 | A1 * | 6/2008 | Gysling | G01F 1/34 702/189 |
| 2008/0189057 | A1 * | 8/2008 | Perry | G01F 1/666 702/48 |
| 2009/0007625 | A1 * | 1/2009 | Ao | G01F 1/668 73/1.31 |
| 2010/0313958 | A1 * | 12/2010 | Patel | G01M 3/2815 137/1 |
| 2013/0080081 | A1 * | 3/2013 | Dugger | G01F 1/667 702/48 |
| 2013/0245994 | A1 * | 9/2013 | Strothmann | H02P 6/185 702/151 |
| 2014/0040340 | A1 | 2/2014 | Shimizu | |
| 2014/0069207 | A1 * | 3/2014 | Leaders | G01F 1/667 73/861.28 |
| 2014/0298882 | A1 * | 10/2014 | Cotton | G01F 25/0007 73/1.16 |
| 2014/0369166 | A1 * | 12/2014 | McDavid | G01V 1/36 367/43 |
| 2014/0371594 | A1 | 12/2014 | Flynn et al. | |
| 2015/0084806 | A1 * | 3/2015 | Rohling | G01S 13/345 342/109 |
| 2015/0241337 | A1 * | 8/2015 | Talabi | G06Q 30/0278 705/306 |
| 2016/0334255 | A1 * | 11/2016 | Gestner | G01F 1/667 |
| 2017/0082650 | A1 * | 3/2017 | Hies | G01F 25/0007 |
| 2017/0115255 | A1 * | 4/2017 | Sathyanarayana | G01N 29/346 |
| 2017/0156704 | A1 * | 6/2017 | Flynn | G01S 15/8984 |
| 2017/0227568 | A1 * | 8/2017 | Hies | G01P 5/244 |
| 2017/0268915 | A1 * | 9/2017 | Gestner | G01F 1/662 |
| 2018/0010940 | A1 * | 1/2018 | Sonnenberg | G01F 1/66 |
| 2018/0113145 | A1 * | 4/2018 | Hies | G01P 5/244 |

OTHER PUBLICATIONS

Roosnek; "Novel digital signal processing techniques for ultrasonic gas flow measurements"; Flow Measurement and Instrumentation; vol. 11, Issue 2, Jun. 2000, p. 89-99. (Year: 2000).*

Seybertetal; "Experimental determination of acoustic properties using a two-microphone random-excitation technique"; The Journal of the Acoustical Society of America 61, 1362 (1977). (Year: 1977).*

Mulgrew B., Grant P., Thompson J. (1999) The Fourier transform and spectral analysis. In: Digital Signal Processing. Palgrave, London, https://doi.org/10.1007/978-1-349-14944-5_9 (Year: 1999).*

Forum titled How to 'whiten' a time domain signal?; https://dsp.stackexchange.com/questions/630/how-to-whiten-a-time-domain-signal (Year: 2011).*

Examination Report for AU Application No. 2018208683 dated May 2, 2019.

Examination Report for AU Application No. 2016317663 dated Jul. 27, 2017.

Examination Search Report for CA Application No. 2,969,343 dated Jul. 7, 2017.

Supplementary European Search Report for Application No. 16842677.3 dated Apr. 24, 2018.

Yukio Fukayama et al: "Acoustic Gas Temperature and Flow Measurement", Transactions of the Society of Instrument and Control Engineers, 2001, pp. 21-28, XP055465232, DOI: 10.9746/sicetr1965.37.21 Retrieved from the Internet: URL:https://pdfs.semanticscholar.org/a8b6/98a4644ddbc700ele8c74ebfb1623b46a887.pdf.

International Search Report for PCT/US2016/048944 dated Nov. 30, 2016. (3 pages).

Written Opinion of the International Searching Authority for PCT/US2016/048944 dated Nov. 30, 2016. (6 pages).

Foreign Action other than Search Report on AU Appl. Ser. No. 2018208683 dated Jan. 22, 2020 (3 pages).

* cited by examiner

FLOW METER CONFIGURATION AND CALIBRATION

RELATED APPLICATION

This application is a U.S. National Phase under 35 U.S.C. § 365(a) of International Application No. PCT/US2016/048944, filed Aug. 26, 2016, which claims priority to U.S. Provisional Application No. 62/211,607, entitled "FLOW METER CONFIGURATION AND CALIBRATION" and filed on Aug. 28, 2015, both of which are incorporated herein by reference in their entirety.

BACKGROUND

Flow meters are typically employed to measure fluid flow rate and monitor fluid usage in fluid distribution systems, such as water or natural gas distribution systems. Flow meters can also allow for fluid leak detection and remote monitoring of fluid flow in the fluid distribution systems. Flow meters can also be used to collect statistical data with regard to fluid usage by various devices coupled to a fluid distribution system.

SUMMARY

According to at least one aspect, a method for configuring a fluid flow meter can include a processor obtaining a measurement signal recorded by the fluid flow meter. The processor can determine a whitening frequency band. The processor can then construct a whitening filter based on the measurement signal and the whitening frequency band. The processor can then generate a reference signal based on the whitening filter and the measurement signal. The processor can provide the whitening filter and the reference signal for use by the fluid flow meter to measure a time shift between the reference signal and another measurement signal.

According to at least one other aspect, a system for configuring an ultrasonic fluid flow meter can include a processor and a memory storing computer executable instructions thereon. The computer executable instructions when executed by the processor cause the processor to receive an input signal associated with a measurement signal recorded by the ultrasonic fluid flow meter mounted on a structure defining a lumen. The measurement signal represents an ultrasonic signal propagating through fluid flowing in the lumen. The processor can also determine a whitening frequency band based on the input signal and construct a whitening filter based on the whitening frequency band and the input signal. The processor can also generate a reference signal by filtering the input signal using the whitening filter, and provide representations of the whitening filter and the reference signal to the fluid flow meter. The fluid flow meter can use the representations of the whitening filter and the reference signal in estimating fluid flow rates based on ultrasonic signals measured by the fluid flow meter. The fluid flow meter can be configured to filter a measured ultrasonic signal using the whitening filter and cross correlate the filtered ultrasonic signal with the reference signal to estimate a time shift associated with the measured ultrasonic signal.

According to at least one other aspect, a method of configuring ultrasonic fluid flow meters can include a processor receiving an input signal associated with a measurement signal recorded by an ultrasonic fluid flow meter mounted on a structure defining a lumen. The measurement signal represents an ultrasonic signal propagating through fluid flowing in the lumen. The method can also include the processor determining a whitening frequency band based on the input signal and constructing a whitening filter based on the whitening frequency band and the input signal. The method can also include the processor generating a reference signal by filtering the input signal using the whitening filter, and providing representations of the whitening filter and the reference signal to the fluid flow meter. The fluid flow meter can use the representations of the whitening filter and the reference signal in estimating fluid flow rates based on ultrasonic signals measured by the fluid flow meter. The fluid flow meter can be configured to filter a measured ultrasonic signal using the whitening filter and cross correlate the filtered ultrasonic signal with the reference signal to estimate a time shift associated with the measured ultrasonic signal.

According to at least one other aspect, a computer-readable medium can include computer code instructions stored thereon. The computer code instructions when executed by a processor cause the processor to receive an input signal associated with a measurement signal recorded by an ultrasonic fluid flow meter mounted on a structure defining a lumen. The measurement signal represents an ultrasonic signal propagating through fluid flowing in the lumen. The processor can determine a whitening frequency band based on the input signal, and construct a whitening filter based on the whitening frequency band and the input signal. The processor can also generate a reference signal by filtering the input signal using the whitening filter, and provide representations of the whitening filter and the reference signal to the fluid flow meter. The fluid flow meter can use the representations of the whitening filter and the reference signal in estimating fluid flow rates based on ultrasonic signals measured by the fluid flow meter. The fluid flow meter can be configured to filter a measured ultrasonic signal using the whitening filter and cross correlate the filtered ultrasonic signal with the reference signal to estimate a time shift associated with the measured ultrasonic signal.

DETAILED DESCRIPTION

Figure 1:
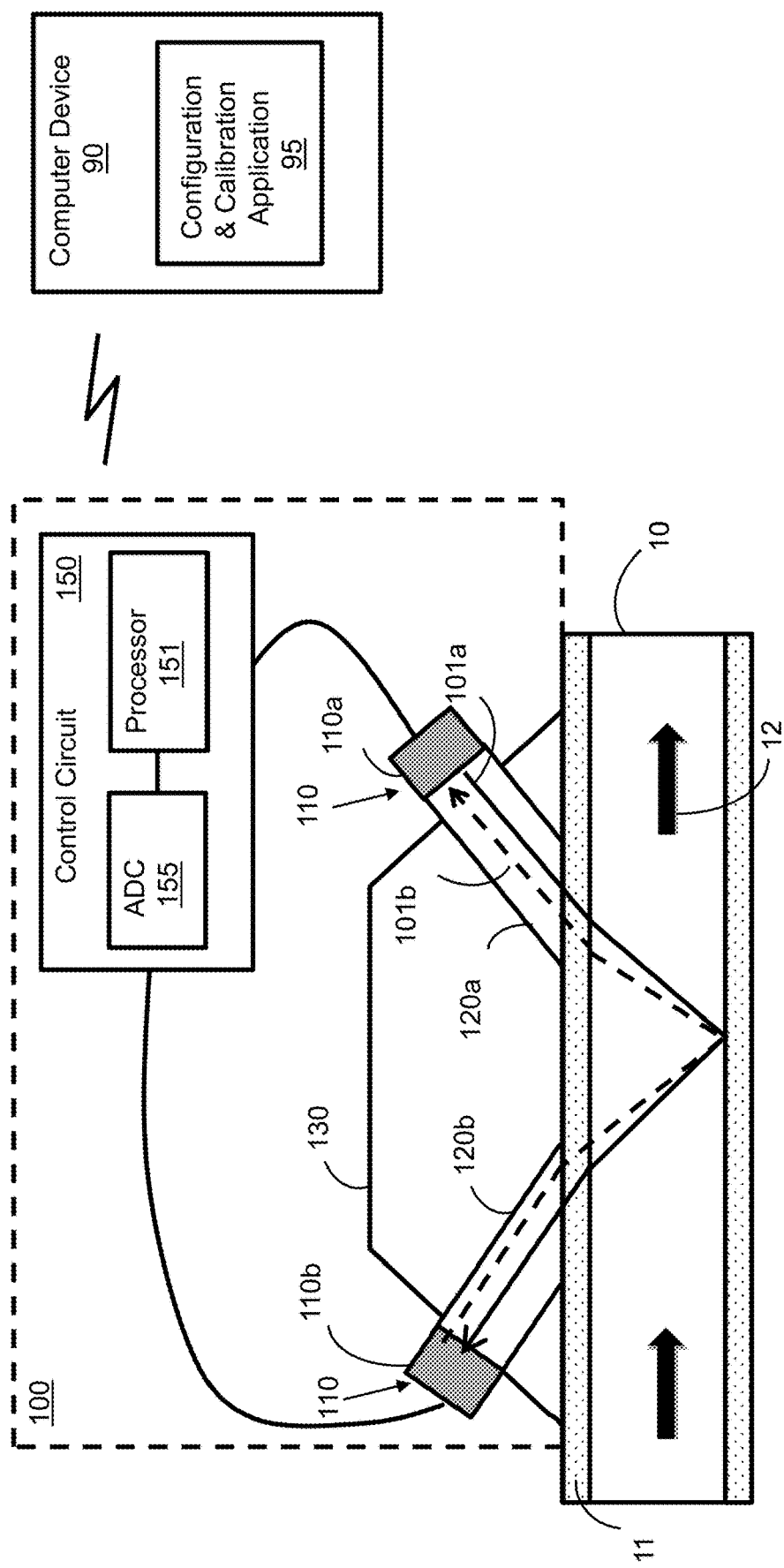
FIG. 1 shows a diagram illustrating a system for configuring or calibrating a fluid flow meter mounted on a lumen.

Ultrasonic fluid flow meters employ ultrasonic waves to measure the flow rate (or flow velocity) of a fluid flowing within a lumen, such as a pipe, tailpiece, conduit or the like, of a fluid distribution system. A lumen as described herein represents a cavity or chamber of a tubular structure such as a pipe or tailpiece for channeling fluid within a fluid distribution system. In particular, an ultrasonic fluid flow meter can include ultrasonic transducers capable of transmitting ultrasonic signals to propagate through the fluid flowing in the lumen and receiving copies of the transmitted signals. The ultrasonic flow meter can estimate the fluid flow rate (or fluid flow velocity) based on measured or estimated propagation characteristics of the ultrasonic signal within the fluid. The ultrasonic signal propagation time can vary depending on the type of fluid, fluid flow velocity with respect to signal propagation direction, fluid temperature, the size of the lumen, the material of the lumen or other fluid parameters that can affect fluid density or fluid compressibility.

The ultrasonic fluid flow meter can determine the fluid flow rate (or fluid flow velocity) based on time difference(s) in signal propagation times for ultrasonic signals propagating under different fluid flow conditions (e.g., upstream and downstream signals, upstream and zero-flow signals, or zero-flow and downstream signals) in the lumen. Such time difference depends on the fluid flow rate (or fluid flow velocity). For example water flow rate (or water flow velocity) can be linearly proportional to the time difference between upstream signal propagation time and downstream signal propagation time. Accordingly, the ultrasonic fluid flow meter can estimate the time difference in signal propagation times and compute the fluid flow rate (or fluid flow velocity) based on the estimated time difference between signal propagation times. In some implementations, such time difference(s) between signal propagation times can be in the range of nano-seconds (ns).

Ultrasonic fluid flow meters (or other types of fluid flow meters) can include internal parameters for use in estimating the time difference(s) between the signal propagation times or for computing fluid flow rate (or fluid flow velocity) based on the estimated time difference(s). For instance, an ultrasonic fluid flow meter (or other type of fluid flow meter) can employ a match filter to estimate signal propagation times or time difference(s) between distinct signal propagation times. In some instances, the ultrasonic fluid flow meter can employ a conversion factor or a conversion lookup table (LUT) for computing fluid flow rate (or flow velocity) based on estimated (or measured) time difference(s) between propagation times of various signals. The accuracy of a flow meter in measuring fluid flow rate (or fluid flow velocity) depends on the respective internal parameters.

The shape and propagation time associated with a receive (RX) signal (e.g., received by a ultrasonic transducer after propagating through the lumen wall and/or the fluid in the lumen) depend on installation parameters, such as lumen size, lumen material, transducers configuration, type of fluid flowing the lumen, etc., of the fluid flow meter. Such parameters can be determined at the time the fluid flow meter is installed, for example, on a pipe. Also, the shape and propagation time associated with a receive (RX) signal can vary with variations in ambient or fluid temperature. Accordingly, configuring and/or calibrating a fluid flow meter during installation allows for adjusting of the internal parameters of the fluid flow meter based on, for example, the specifics of the pipe on which the fluid flow meter is installed. The adjustment of the internal parameters of the fluid flow meter during installation enhances the accuracy of the fluid flow meter. Upon installing the flow meter, for example, on a structure defining the lumen, a system can make use of RX signals or measurements obtained by the fluid flow meter to configure the fluid flow meter or adjust one or more respective internal parameters.

FIG. 1 shows a diagram illustrating a system for configuring or calibrating a fluid flow meter 100 mounted on a lumen structure 10 (such as a pipe or tailpiece). The ultrasonic fluid flow meter 100 can include two ultrasonic transducers 110a and 110b (also referred to either individually or collectively as transducer(s) 110), two waveguides 120a and 120b (also referred to either individually or collectively as waveguide(s) 120), a control circuit 150 coupled to the ultrasonic transducers 110 and a transducer block 130 for fixing the ultrasonic transducers 110 to the lumen structure 10. The control circuit 150 can include a processor 151 and an analog-to-digital converter (ADC) 155. The control circuit 150 or the processor 151 can be coupled to a computer device 90 via a wired or wireless connection. The computer device 90 can include a fluid flow meter configuration/calibration application 95 for configuring or calibrating the ultrasonic flow meter 90.

The fluid flow meter configuration/calibration application 95 can be implemented as a software executable instructions that are stored on a memory of the computer device 90 (or a memory of the fluid flow meter 100). The fluid flow meter configuration/calibration application 95 can be executed by a processor of the computer device 90 (or the processor 151). In some implementations where the configuration/calibration application 95 is executed by the fluid flow meter 100 (or the processor 151), the fluid flow meter 100 can include a button to initiate the configuration/calibration application 95.

As shown in FIG. 1, the ultrasonic transducers 110 can be mounted to the lumen structure 10 according to a "V" configuration. In a "V" configuration, the propagation path of ultrasound waves traveling through the lumen structure 10 between the transducers 110 forms a "V" shape. In particular, ultrasound waves transmitted by one of the transducers 110 reflect back from the inner side of the lumen wall 11 before reaching the other transducer 110. In some implementations, the transducers 110 can be arranged across each other according to a "Z" configuration, such that the signal path between the transducers 110 forms an angle (such as an angle greater than zero and less than 90 degrees) with the longitudinal axis of the lumen 10. That is ultrasound waves can travel through the lumen structure 10 between the transducers 110 without necessarily reflecting back from the lumen wall 11. In some implementations, the transducers 110 can be arranged according to other configurations such as "M" configuration, "W" configuration where the ultrasonic signal reflects back three times from the lumen wall 11 before reaching the other transducer 110, or other configurations known in the art. The transducers configuration can affect the shape, propagation time and energy of the RX signal(s). The transducers 110 can be mounted to the lumen structure 10 in a non-invasive manner. That is, the ultrasonic transducers 110 or the waveguides 120 do not interfere with the fluid flow path within the lumen. In some implementations, the transducers 110 can be placed within openings of the lumen wall 11 in an invasive manner. However, non-invasive installation is easier as it can be performed without cutting through or dislocating any pipes. The fluid flow meter 100 can be mounted on or attached to the lumen wall 11. In some implementations, the waveguides 120 can be optional. In such implementations, the transducers 110 can be mounted directly to the lumen structure 10 without waveguides 120.

Each of the ultrasonic transducers 110 can be capable of transmitting and receiving ultrasonic signals. For instance, the ultrasonic transducer 110*a* can transmit the ultrasonic signal 101*a*, which propagates through the waveguide 120*a* and the lumen wall 11 into the lumen, reflects back from the lumen wall 11 towards the waveguide 120*b* and is received at the ultrasonic transducer 110*b*. The ultrasonic transducer 110*b* can transmit the ultrasonic signal 101*b*, which propagates through the waveguide 120*b* and the lumen wall 11 into the lumen, reflects back from the lumen wall 11 towards the waveguide 120*a* and is received at the ultrasonic transducer 110*a*. In the lumen, fluid is flowing according to direction 12. As such, the ultrasonic signal 101*a* propagates upstream (e.g., having a motion component along the longitudinal axis of the lumen structure 10 that is in opposite direction compared to the fluid flow direction 12) within the lumen and the ultrasonic signal 101*b* propagates downstream (e.g., having a motion component along the longitudinal axis of the lumen structure 10 that is in the same direction as the fluid flow direction 12). Given the propagation direction of the ultrasonic signals 101*a* and 101*b* with respect to the fluid flow direction 12, the respective propagation times are affected differently by the fluid flow. For instance, the propagation time of the downstream ultrasonic signal 101*b* is shorter than that of the upstream ultrasonic signal 101*a*. Ultrasonic signals propagating through the fluid are also referred to herein as ultrasonic signal(s) 101. In some implementations, the ultrasonic transducers 110 can transmit signals in one direction (e.g., downstream or upstream). In such implementations, signal propagation time can be compared to propagation time associated with a signal propagating in zero-flow or non-moving fluid to determine the effect of fluid flow on signal propagation through the fluid.

In some implementations, the fluid flow meter 100 can include more than two ultrasonic transducers 110. In some implementations, each ultrasonic transducer 110 in the fluid flow meter 100 can be capable of acting as a transmitter and a receiver. In some implementations, some ultrasonic transducers 110 in the fluid flow meter 100 can be configured or designated to act as transmitters while others can be configured or designated to act as receivers. While the fluid flow meter 100 employs the ultrasonic transducers 110 to transmit or receive signals, other types of signal transmitters/receivers such as acoustic or electromagnetic transmitters/receivers can be employed.

The ADC 155 can be configured to sample RX ultrasonic signals received at the ultrasonic transducers 110. In some implementations, the sampling rate of the ADC 155 can be smaller than a sampling rate associated with a desired signal resolution (or a desired sampling rate) for achieving accurate estimation of fluid flow rate, fluid flow velocity or relative time delays associated with RX ultrasonic signals. For instance, the sampling period of the ADC 155 can be in the range of micro-seconds (µs) while a desired resolution of relative time delays between ultrasonic signals 101 propagating within the fluid can be in the range of nano-seconds (ns). The ADC 155 can be coupled to the processor 151 or a memory associated with the control circuit 150. For instance, the ADC 155 can be configured to provide signal samples directly to the processor 151 or store the samples in a memory accessible by the processor 151. The control circuit 150 can further include a digital-to-analog converter (DAC) configured to convert waveform samples into analog signals. For instance, the DAC can convert samples of a digital excitation signal into a respective analog excitation signal that is provided as input to one of the ultrasonic transducers 110. The processor 151 or a memory associated with the control circuit 150 can store the samples of the digital excitation signal. In some implementations, the ADC 151 can be capable of operating as an ADC and a DAC. In some implementations, the digital excitation signal can include a pseudo random noise, a pulse train with a given frequency, pure tone at a given frequency, liner or logarithmic chirp signal or frequency modulated pulse train (e.g., with increasing or decreasing frequency). In response to the input analog excitation signal, the transducer 110 can output a band-pass signal that is transmitted into the lumen 10.

The processor 151 can be configured to control the operation and timing of the ultrasonic transducers 110 such as initiating transmission/reception of ultrasonic signals 101, control the operation of the ADC 155 such as initiating signal sampling by the ADC 155, control the operation of one or more other components of the control circuit 150, initiate and mange communication with other devices such as the computer device 90, execute processes for estimating flow rate or time difference between signal propagation times of distinct signals, manage power consumption of the fluid flow meter 100 or a combination thereof. The processor 151 can include one or more of a microprocessor, microcontroller, digital signal processor (DSP), and application-specific integrated circuit (ASIC). The control circuit 150 can include a memory for storing signal samples, data or computer code instructions executable by the processor 151. The control circuit 150 can also include a communication interface for communicating with other devices such as computer device 90, one or more signal amplifiers, or other analog or digital circuitry. The communication interface can include a wired communication interface such as a universal serial bus (USB) or a wireless communication interface such as a Zigbee interface, BLUETOOTH interface, WiFi interface, or other wireless communication interface.

The computer device 90 can include a tablet, smart phone, laptop, desktop, computer server, cloud server, or other communication device capable of communication with the fluid flow meter 100 or the respective processor 151 through a wired or wireless connection. The computer device 90 can be configured to communicate with the fluid flow meter 100 via one or more communication networks, such as a local area network (LAN), wide area network (WAN), cellular network or other communication network. The computer device 90 can include at least one processor and at least one memory. The computer device 90 can include a fluid flow meter configuration/calibration application 95, which when executed on the computer device 90, can cause the computer device 90 to perform the configuration or the calibration methods described in this disclosure. The fluid flow meter configuration/calibration application 95 can include computer code instructions running on a client device (such as a tablet, smart phone, laptop or desktop), cloud server, or on the processor 151.

Figure 2:
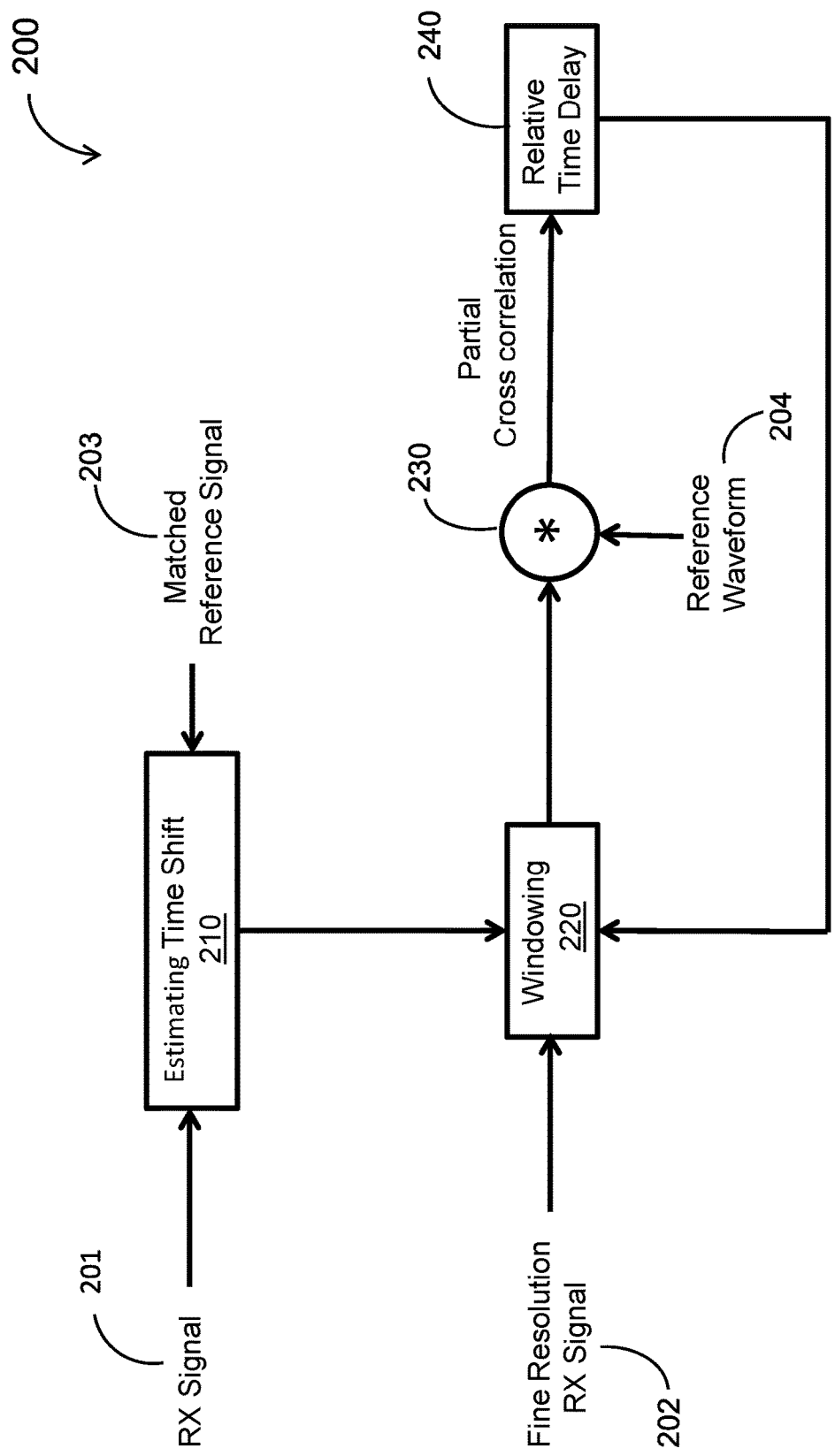
FIG. 2 shows a block diagram illustrating a method of estimating a relative time delay associated with a fine resolution receive (RX) signal using cross-correlation signals.

FIG. 2 shows a block diagram illustrating a method 200 of estimating a relative time delay associated with a a fine resolution RX signal 202 using cross-correlation signals. In brief, the method 200 can include the processor 151 determining a time shift estimate between an RX signal 201 and a matched reference signal 203 (block 210), selecting a window portion of the fine resolution RX signal 202 based on the time shift estimate determined at step 210 (block 220), computing a cross-correlation signal between the window portion of the fine resolution signal 202 and a reference waveform 204 (block 230), and determining an estimate of the relative time delay associated with the fine resolution signal 202 (block 240). The RX signal 201, the fine resolution RX signal 202, the matched reference signal 203 and the reference waveform 204 can be digital signals with respective samples that can be stored, processed or modified by the control circuit 150, the processor 151 or any other processor.

In some implementations, the relative time delay determined at block 240 can represent a signal propagation time estimate for the fine resolution RX signal 202. For instance, if the reference waveform 204 represents a zero-delay signal, the relative time delay between the fine resolution RX signal 202 and the reference waveform 204 can be indicative of the signal propagation time associated with the fine resolution RX signal 202. In some implementations, the reference waveform 204 can be a sine wave, cosine wave, Gaussian function (or signal), sinc function (or signal), or other signal. In some implementations, the reference waveform 204, can be an upstream RX signal, downstream RX signal, zero-flow RX signal or a filtered/modified version thereof. In such implementations, the relative time delay determined at block 240 can be indicative of difference in signal propagation times between the fine resolution RX signal 202 and the reference waveform 204.

The method 200 can include the processor 151 determining an estimate of the time shift between the RX signal 201 and the matched reference signal 203 (block 210). A transducer 110 can receive a continuous version of the RX signal 201. The ADC 155 can sample the continuous version of the RX signal 201 make respective samples available to the processor 151. The matched reference signal 203 (also referred to herein as a matched filter) can be associated with a zero-flow RX signal, upstream RX signal or downstream RX signal. In some implementations, the matched reference signal 203 can be a zero-flow RX signal, downstream RX signal or upstream RX signal sampled by the ADC 155. In some implementations, the matched reference signal 203 can be a signal generated based on a filtered, cropped or otherwise modified version of a zero-flow RX signal, downstream RX signal or upstream RX signal. The processor 151 can determine an estimate of the time shift between the RX signal 201 and the matched reference signal 203 by computing a cross-correlation signal between the RX signal 201 and the matched reference signal 203 and identifying a time location or time index of the maximum cross correlation value of the computed cross correlation signal between the RX signal 201 and the matched reference signal 203.

In some implementations, the matched reference signal 203 can be obtained or generated during a configuration process of the fluid flow meter 100. For instance, the matched reference signal 203 can be determined based on a zero-flow RX signal, upstream RX signal or downstream RX signal that is obtained during the configuration process. In some implementations, the matched reference signal 203 and the RX signal 201 can be associated with two zero-flow RX signals, two upstream RX signals or two downstream RX signals obtained during the configuration process and post configuration, respectively. In such implementations, the time shift estimated in block 210 can represent the drift (or change) in signal propagation time (e.g., for an upstream signal, downstream signal or zero-flow signal) between the time of a configuration process and the time at which the RX signal 201 is measured, for instance, due to temperature variation. In some implementations, the configuration process can be performed after or during installation of the fluid flow meter 100 within a fluid distribution system (e.g., on a pipe or a tailpiece coupled to a pipe).

The processor 151 can generate the fine resolution RX signal 202 by upsampling one or more RX signals. In some implementations, the processor 151 can generate the fine resolution RX signal 202 by interleaving a plurality of RX signals with distinct time delays with respect to a clock signal associated with the control circuit 150. In some implementations, the processor 151 can employ both signal interleaving and upsampling to generate the fine resolution RX signal 202 based on a plurality of RX signals received within a time period. Given the increased resolution of the fine resolution RX signal 202 compared to the respective RX signal(s) from which the fine resolution RX signal 202 is generated, the fine resolution RX signal 202 can allow for a more accurate estimate of the relative time delay 209. However, the increased resolution of the fine resolution RX signal 202 can result in increased computational cost, for instance, when computing a cross correlation signal between the fine resolution RX signal 202 and the reference waveform 204.

The method 200 can include the processor 151 generating a windowed portion or segment of the fine resolution RX signal (block 220). The processor 151 can generate the segment of the fine resolution signal 202 based on the time shift estimate determined at block 210. In some implementations, the processor 151 can select a segment of the fine resolution RX signal to be centered at a time point that is determined based on the time shift estimate determined at block 210 and a time offset value (e.g., the sum of the time shift estimate and the time offset value). In some implementations, the processor 151 (or the computer device 90) can be configured to determine a width of the segment of the fine resolution signal based on a resolution ratio (or upsampling ratio) between the fine resolution RX signal 202 and the respective RX signal(s) used to generate the fine resolution RX signal 202. For instance, the width of the segment of the fine resolution signal (or the width of the window used in block 220) can be determined to include samples associated with one or more lobes of the fine resolution signal 202.

The method 200 can include the processor 151 computing a cross correlation signal between the segment of the fine resolution signal and the reference waveform 204 (block 230). Using the segment of the fine resolution signal, instead of using all the samples of the fine resolution signal 202, to compute the cross correlation signal at block 230 leads to a reduction in the respective computational complexity. The reference waveform 204 can be zero-flow, downstream or upstream RX signal. In some implementations, the reference waveform 204 can be a sine (or cosine) wave or other narrowband signal. In such implementations, the processor 151 can compute a first cross correlation signal representing cross correlation between a fine resolution upstream RX signal and the sine wave (or the narrowband signal), and a second cross correlation signal representing cross correlation between a fine resolution downstream RX signal and the sine wave (or the narrowband signal). The fine resolution upstream RX signal and the fine resolution downstream RX signal can correspond to two distinct (upstream and downstream) RX signals 201.

The method 200 can include the processor 151 determining an estimate of the relative time delay associated with the fine resolution RX signal 202 based on the cross correlation signal (also referred to herein as the partial cross correlation signal) computed at block 230 (block 240). For instance, if the reference waveform 204 is a zero-flow, downstream or upstream RX signal, the processor 151 can determine the relative time delay as the time location associated with a maximum cross correlation value (such as a local or global maximum) of the partial cross correlation signal computed at bock 230. In some instances, the processor 151 can determine the relative time delay based on the time location associated with a zero crossing or a minimum (such as a local or global minimum) of the partial cross correlation signal computed at block 230. In some implementations, if the processor 151 fails to identify a maximum (or minimum or zero-crossing) of the partial cross correlation signal, the processor 151 can be configured to adjust the segment at block 220 (e.g., by sliding a time window) and re-compute the partial cross correlation signal (or samples thereof) to determine the relative time delay.

In the case where the reference waveform 204 is a sine (or cosine) wave or other narrowband signal, the processor 151 can determine a difference in signal propagation time between the upstream signal and the downstream signal using corresponding first and second cross correlation signals. The processor 151 can determine such difference in signal propagation time based on a time shift between the first and second cross correlation signals. For instance, the processor 151 can determine the time shift as the time shift between two maxima (global or local), two minima (global or local) or two zero crossings associated with the first and second cross correlation signals, respectively. Such time difference or time shift represents the difference in signal propagation times upstream and downstream. The processor 151 can then determine the fluid flow rate (or fluid flow velocity) based on the difference in signal propagation times using, for instance, a conversion factor or a lookup table (LUT). The conversion factor or the LUT map maps the computed difference in signal propagation times to corresponding fluid flow rate (or fluid flow velocity). In some implementations, the processor 151 can compute the difference in signal propagation times between zero-flow and downstream or between upstream and zero-flow.

Figure 3:
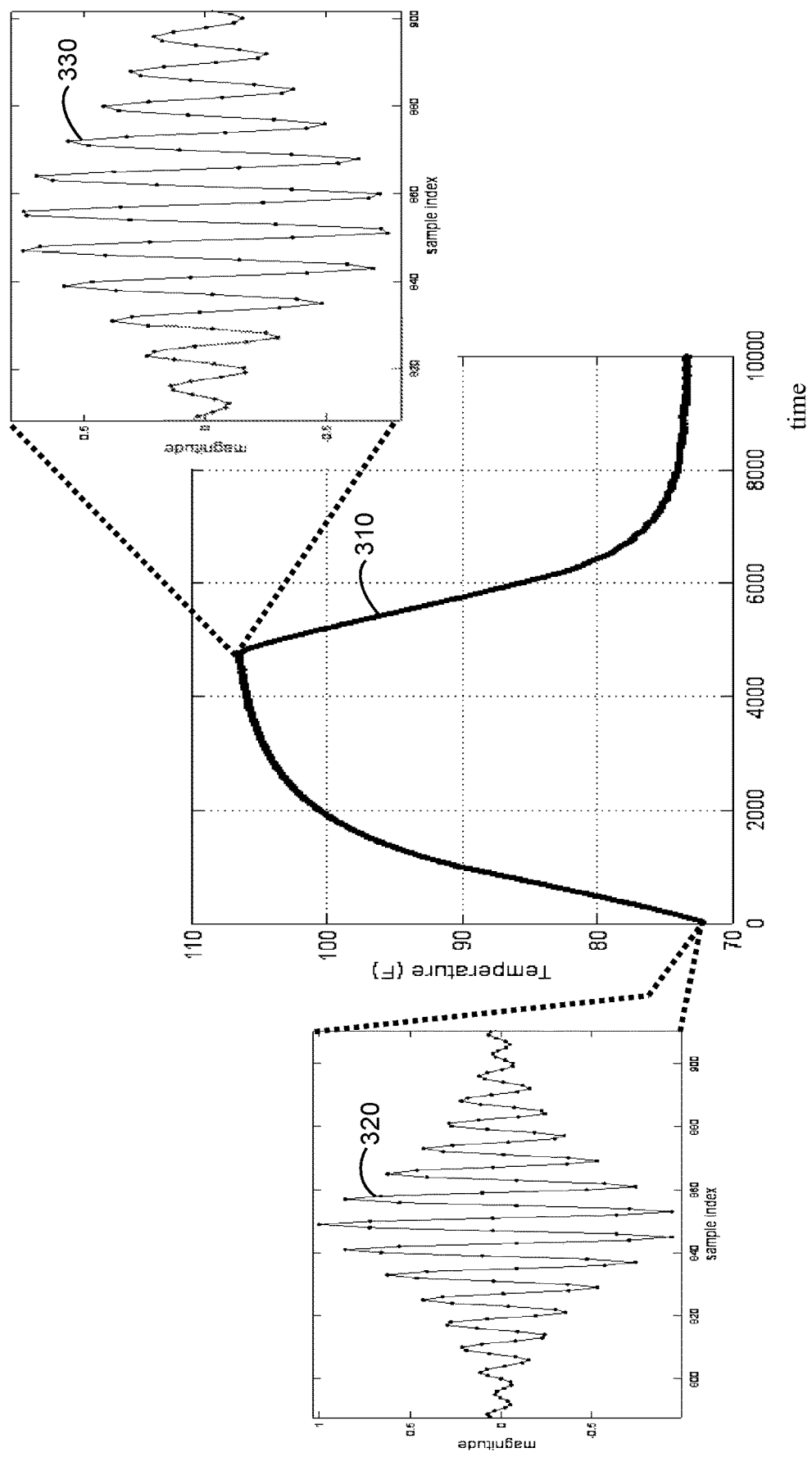
FIG. 3 shows plots illustrating cross correlation signals between a reference signal and receive (RX) signals associated with different fluid temperature values.

FIG. 3 shows plots illustrating cross correlation signals between a reference signal and receive (RX) signals associated with different fluid temperature values. The temperature plot 310 illustrates fluid temperature variation over time in a lumen. The plot 320 shows a cross correlation signal between a reference signal and a RX signal measured when the fluid temperature is about 72 Fahrenheit (F). The plot 330 shows a cross correlation signal between the reference signal and a RX signal measured when the fluid temperature is about 107 F. Both RX signals are measured by ultrasonic transducers and sampled by an ADC. Both cross correlation signals shown through plots 320 and 330 are computed using the same reference signal (e.g., a zero-flow RX signal).

The cross correlation signals 320 and 330 associated with fluid temperatures equal to 72 F and 107 F, respectively, are different in shape and in magnitude. For instance, the cross correlation values in the cross correlation signal 320 range vary between −1 and 1, whereas the cross correlation values in the cross correlation signal 330 vary between about −0.8 and 0.8. Also, while the cross correlation signal 320 has a global maximum that is clearly greater than the next two local maxima, the three largest maxima of the cross correlation signal 330 have respective amplitudes that are very close to one another. The difference between the cross correlation signals 320 and 330 is due to the effect of temperature variation on measured RX signals. For instance, as the fluid temperature decreases, the signal propagation time through the lumen 10 between the transducers 110 gets longer and as the fluid temperature increases the signal propagation time gets shorter. In addition, since ultrasonic waves propagating between the transducers 110 pass through the lumen wall 11, changes in the temperature of the lumen wall can also affect the shape and propagation times of the RX ultrasonic signals.

Changes in the cross correlation signals, such as the differences between cross correlation signals 320 and 330, due to temperature variation can affect the accuracy of the fluid flow meter 100 in measuring fluid flow rate or fluid flow velocity. In particular, changes in the peaks of the cross correlation signals and their time location due to temperature variation can have a degradation effect on the estimation of relative time delays associated with RX signals obtained by the transducers 110. In addition to temperature variation, the installation parameters of the transducers 110 can also effect the shapes and propagation times of the RX signals received by the transducers 110. For instance, signal propagation times and RX signal shapes depend on the relative positions of the transducers 110 with respect to each other, the distance between the transducers 110, the shape and length of the signal propagation paths between the transducers 110, the size of the lumen structure 10 (e.g., diameter of the lumen structure 10), lumen wall material, thickness of lumen wall 11 or a combination thereof.

In the current disclosure, systems and methods for configuration and/or calibration of installed fluid flow meters (e.g., on-pipe configuration and/or calibration) allow for mitigation of the effect of temperature variation and fluid flow meter installation parameters on measured fluid flow rates (or fluid flow velocities) measured by the fluid flow meters. Accordingly, the accuracy of a fluid flow meter can be improved by applying the on-pipe configuration and/or calibration processes in this disclosure.

Figure 4A:
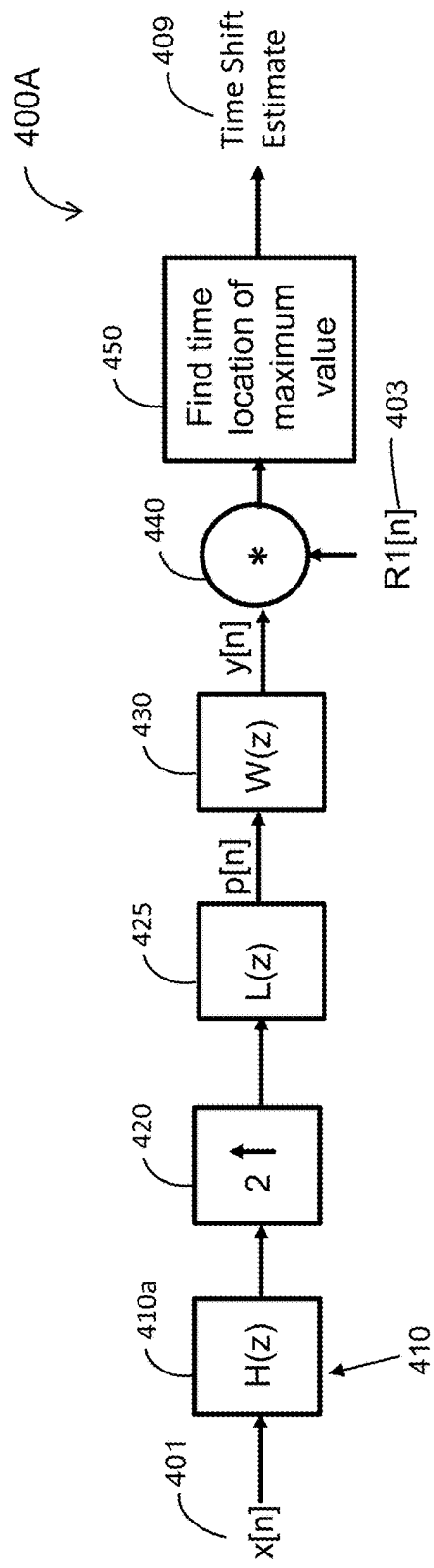
FIGS. 4A and 4B show block diagrams illustrating methods for computing a relative time delay estimate between an RX signal and a reference signal.
Figure 4B:
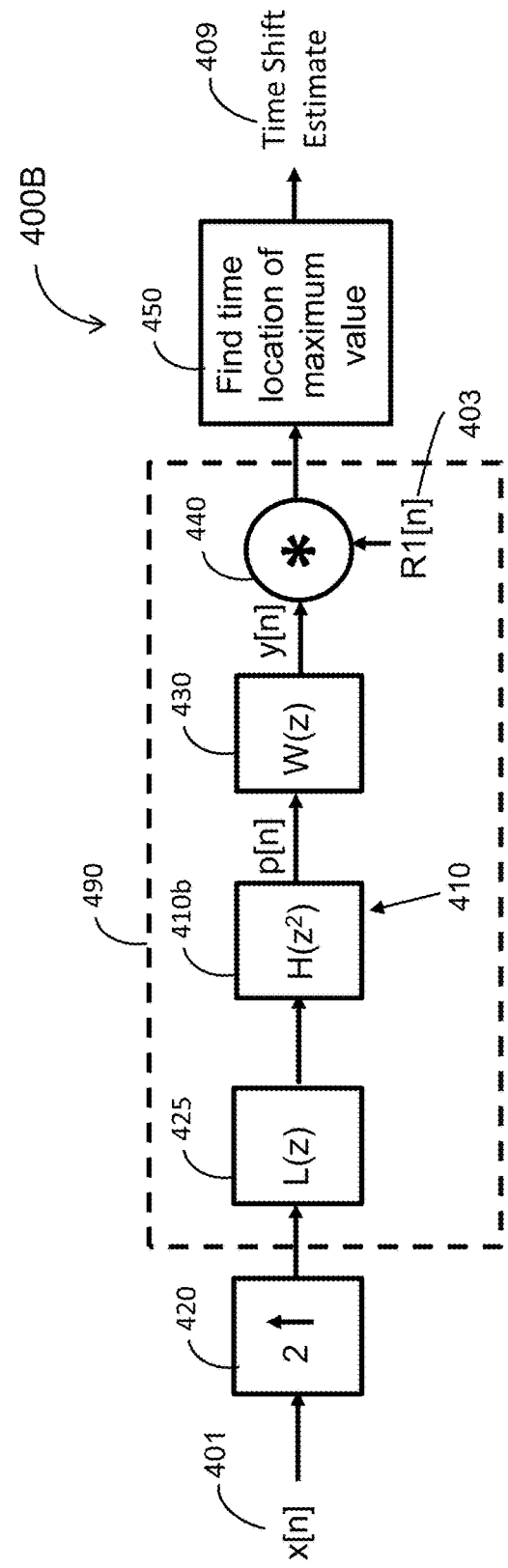

FIGS. 4A and 4B show block diagrams illustrating methods 400A and 400B for computing a time shift estimate 409 between an RX signal 401 (or a respective filtered/modified version) and a reference signal 403. In some implementations, the time shift 409 can represent a difference in signal propagation time (with respect to the reference signal 403) due to temperature variation. In some implementations, the method 400A or 400B can represent processes performed at block 210 of FIG. 2 to determine a coarse estimate of a relative time shift between a measured ultrasonic signal and a reference signal. In the case where the reference signal (e.g., matched reference signal 203) is generated using a zero-flow ultrasonic signal the coarse estimate of the time shift represents a coarse shift of the propagation time of the measured ultrasonic signal. In some implementations, the method 400A or 400B can represent a process to estimate a propagation time of the measured ultrasonic signal (e.g., not just a coarse estimate but a final estimate) based on a reference signal associated, for example, with a zero-flow ultrasonic signal.

In a brief overview, the method 400A can include the processor 151 high-pass filtering the RX signal (x[n]) 401 (high-pass filter H(z) block 410a), upsampling the filtered RX signal (zero padding block 420 and low-pass filtering by low-pass filter L(z) block 425), whitening the upsampled signal (whitening filter W(z) block 430), computing a cross correlation signal between the whitened signal and a reference signal R1[n] 403 (cross correlation block 440), and locating the maximum cross correlation value in the computed cross correlation signal (block 450). The method 400B is similar to the method 400A, except that the high-pass filtering using the high-pass filter H(z) 410b is applied after upsampling the RX signal x[n] 401 in the method 400B. Also, the impulse response of the high-pass filter H(z) 410b in the method 400B can have a higher sampling rate in the time domain than the impulse response of the high-pass filter 410a used in the method 400A. The high-pass filters 410a and 410b are referred to herein, individually or collectively as high-pass filter 410.

The high-pass filter 410 can have a cut-off frequency determined based on the frequency response of the transducers. For instance, the frequency response of the transducers can have a pass-band between about 1.5 MHz (Mega Hertz) and about 2.5 MHz. As used herein, a frequency value that is equal to about 1.5 MHz can be a frequency value within the frequency range 1.4 MHz to 1.6 MHz, the frequency range 1.3 MHz to 1.7 MHz, or other frequency range around 1.5 MHz. Also, a frequency value that is equal to about 2.5 MHz can be a frequency value within the frequency range 2.4 MHz to 2.6 MHz, the frequency range 2.3 MHz to 2.7 MHz, or other frequency range around 2.5 MHz. In some implementations, the cut-off frequency of the high-pass filter 430 can be equal to 1 MHz, 1.1 MHz or other frequency value smaller than or equal to the lowest frequency value in the pass-band of the transducers.

In some implementations, the processor 151 can increase the resolution of the RX signal 401 or a respective filtered version by applying zero-padding 420 and interpolation using the low-pass filter L(z) 425. In some implementations, depending on the sampling rate of the RX signal 401 (e.g., sampling rate of the ADC 155), the process of increasing the resolution of (or upsampling) the RX signal 401 can be optional. For instance, the upsampling process may be optional if a cross correlation signal between the RX signal 401 and the reference signal R1[n] 403 allows for accurate estimation of the time shift 409 (e.g., the peak of the cross-correlation signal can be accurately identified). In some implementations, an upsampling factor greater than two can be employed by the processor 151 to increase the resolution of the RX signal 401 or a respective filtered version. In some implementations, the impulse response of the low-pass filter L(z) 425 can be a truncated sinc function, truncated cubic-spline interpolation filter, or other a interpolation filter known in the art.

The whitening filter W(z) 430 is configured to enforce the whitened signal y[n] (e.g., the output of the whitening filter W(z) 430) to have a constant magnitude in the frequency domain within a specific frequency band B. That is, given the Fourier transform P(o) of the signal p[n] (e.g., the input signal to the whitening filter 430), where w is the angular frequency, the Fourier transform W(ω) of the whitening filter can be defined within the frequency band B as $$W(2\pi f) = \frac{\alpha}{|P'(2\pi f)|},$$

In some implementations, the Fourier transform W(ω) of the whitening filter 430 can be equal to zero outside the frequency band B. In such implementations, the use of the high-pass filter 410 and/or the interpolation filter 425 can be optional.

The method 400A or 400B can include the processor 151 computing a cross correlation signal between the output of the whitening filter (y[n]) and the reference signal R1[n] 403 (cross correlation bock 440). In some implementations, the processor 151 can compute the cross correlation signal by computing a convolution of the signal y[n] with a time-reversed version of the reference signal R1[n]. In some implementations, the reference signal R1[n] can represent a filtered version of a RX signal (such as a zero-flow RX signal, an upstream RX signal or a downstream RX signal) measured during configuration of the flow meter 100. In some implementations, the reference signal R1[n] can represent a whitened version (e.g., using the whitening filter 430) of a RX signal obtained during a configuration process of the fluid flow meter 100.

The method 400A or 400B can include the processor 151 determining a time location of the maximum cross correlation value (block 450) within the cross correlation signal computed at block 440. For instance, the processor can use a max( )) function or a search algorithm to identify the maximum cross correlation value and determine the respective time location (or time index). The processor 151 can use the time index of the identified maximum cross correlation value as the time shift estimate 409.

In some implementations, the processor 151 can obtain representations of the reference signal R1[n], the whitening filter 430, the high-pass filter 410, the low-pass filter 425 or a combination thereof during a configuration process of the fluid flow meter 100. In some implementations, the processor 151 can obtain a representation of a filter 490 that is a concatenation of the low-pass filter 420, the high-pass filter 410, the whitening filter 430 and the filter with an impulse response equal to the time-reversed version of the reference signal R1[n]. In some implementations, the low-pass filter 425 and/or the high-pass filter 410 may be optional and the processor 151 can obtain a filter representing a different concatenation, such as a concatenation of the whitening filter 430 and the filter with an impulse response equal to the time-reversed version of the reference signal R1[n]. In some implementations, the configuration process can be performed by computer device 90 capable of communicating with the flow meter 100. For instance, the computer device 90 can include a memory to store computer code instructions associated with the configuration application 95 and a processor to execute the computer code instructions. The computer device 90 can include a communication interface for communicating with the flow meter 100. In some implementations, the configuration process can be performed by the processor 151. For instance, the flow meter 100 can include a configuration button for initiating the configuration process.

The computer device 90 (or the configuration application 95 running thereon) can obtain samples of one or more RX signals recorded by the fluid flow meter 100 and determine the whitening filter, the reference signal 403, the high-pass filter 410, the low-pass filter 425 or a combination thereof. The computer device 90 can then send indication(s) of the determined filters and/or signals (or a concatenation thereof) to the processor 151 through a communication interface. In some implementations, the computer device 90 can be a client device (such as a tablet, laptop, smart phone, desktop, or other client device) coupled to the flow meter 100 (or the control circuit 150) during the configuration process through WiFi, BLUETOOTH, Zigbee, near field communication (NFC), USB ports, or other communication interface. In some implementations, the computer device 90 can be a server (such as a cloud server) coupled to the flow meter 100 through a local area network, wide area network, cellular network, Internet, public switched network, other communication network or a combination thereof.

Figure 5:
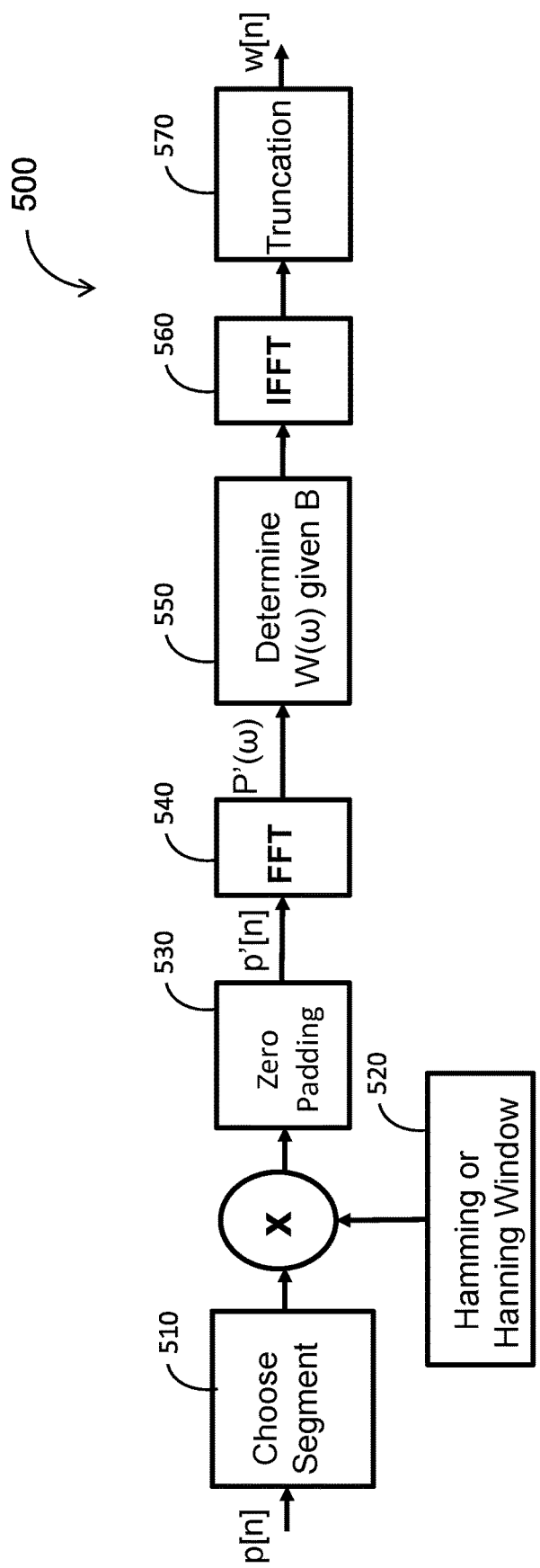
FIG. 5 is a block diagram illustrating a method of determining a whitening filter based on a whitening frequency band and a RX signal, according to an illustrative implementation.

FIG. 5 is a flow diagram illustrating a method 500 of determining a whitening filter based on a whitening frequency band B and a RX signal, according to an illustrative implementation. In the method 500, the signal p[n] can represent a filtered or processed version of the RX signal. For instance, as illustrated in FIGS. 4A and 4B, the signal p[n] can be an upsampled and filtered version of the RX signal. In some implementations, the method 500 can be applied to the RX signal instead of a respective filtered/processed version. The method 500 can be executed by a processor associated with the computer device 90 or a processor associated with the fluid flow meter 100 (such as processor 151). The method 500 can include the processor selecting a segment of an input signal p[n], such a RX signal or a processed/filtered version thereof (step 510). The processor can be configured to select a signal segment such that signal components (or portions) associated with signal propagation through the lumen wall are eliminated. That is, the processor can nullify samples of the input signal that represent a portion of the RX signal propagating in the lumen wall 11 but not through the fluid in the lumen. The method 500 can also include the processor applying a windowing operation (block 520) to the selected signal segment. For instance, the processor can employ a Hamming time window, Hanning time window, or other type of time window known in the art. The windowing operation (block 520) can allow for matching the first and last samples of the selected signal segment. The processor can then apply zero padding (block 530) at the start and end of the signal segment. The zero padding (block 530) can mitigate undesired artifacts associated with computation of the fast Fourier transform (FFT). In some implementations, any of the processes in blocks 510, 520 or 530 can be optional.

The method 500 can include the processor computing the Fourier transform (e.g., FFT) of the signal p'[n] (block 540), and determining the frequency response of the whitening filter based on the computed Fourier transform and the whitening frequency band B (block 550). For instance, the processor can compute the frequency response (or frequency component) of the whitening filter at a frequency f within the frequency band B as $$W(\omega) = \frac{1}{|P(\omega)|}.$$

where |P/(2πf)| is the magnitude of the Fourier transform of the signal segment (computed at block 540) at the same frequency f and a is a real number. Outside the frequency band B, the processor can set the frequency response of the whitening filter to be equal to zero (or substantially equal to zero). In some implementations, the processor can compute the frequency response of the whitening filter using the Fourier transform of the RX signal. In some implementations, the processor can employ other techniques known in the art to compute the frequency response of the whitening filter based on the Fourier transform of the RX signal (or a processed/filtered version thereof) and a given whitening frequency band.

Upon computing the frequency response of the whitening filter, the processor can compute the respective inverse Fourier transform (e.g., using inverse fast Fourier transform (IFFT)) (block 560) to determine the impulse response of the whitening filter. In some implementations, the processor can apply a truncation operation (block 570). In particular, the processor can select a segment (or a subset of the samples) of the signal obtained after performing the inverse Fourier transform at block 560. For instance, the processor can ignore or nullify samples at both sides of the signal output by the IFFT block 560.

Figure 6:
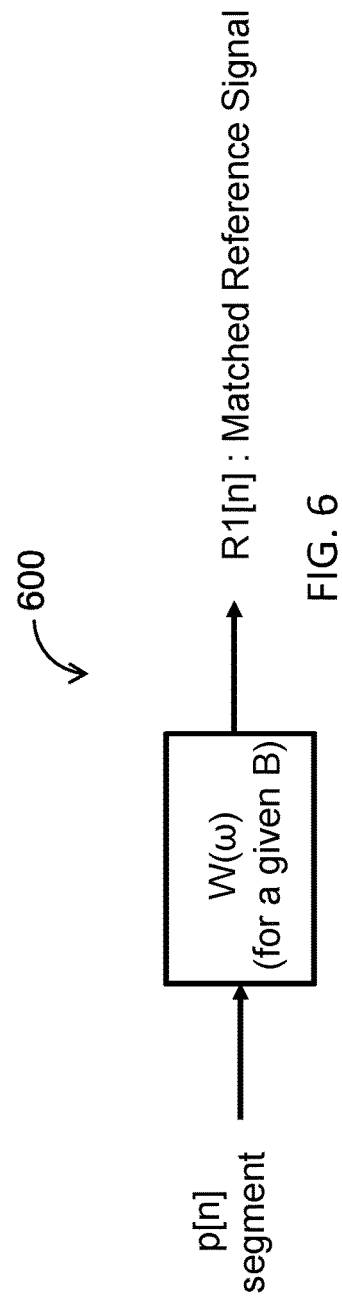
FIG. 6 shows a block diagram illustrating a method of determining a reference signal based on a RX signal and a whitening filter.

FIG. 6 shows a flow diagram illustrating a method 600 of determining a reference signal based on a RX signal and a whitening filter. Upon determining a whitening filter, e.g., as discussed above with regard to FIG. 5, the processor can compute or generate the reference signal by filtering the RX signal or a respective processed/filtered version (such as signal p[n] or a segment thereof) with the whitening filter. For instance, the processor can compute the matched reference signal R1[n] as the convolution of the signal p[n] (or a segment thereof) and the impulse response of the whitening filter w[n]. The signal p[n] as shown in FIG. 6 can represent an upsampled and/or filtered version of the RX signal (as discussed above with regard to FIGS. 4A, 4B and 5). In some implementations, the processor can compute the matched reference signal R1[n] as the convolution of the RX signal (or a segment thereof) and the impulse response of the whitening filter w[n].

Both method 500 for determining the whitening filter and method 600 for computing the matched reference signal can be performed by the fluid flow meter configuration and calibration application 95. The fluid flow meter configuration and calibration application 95 can then provide representation(s) of the whitening filter and the matched reference signal to the fluid flow meter 100 for use to estimate (or measure) fluid flow rate or fluid velocity. Specifically, the fluid flow meter 100 can filter measured RX ultrasonic signals with the whitening filter and cross correlate the corresponding filtered signals with the matched reference signal to determine relative time shifts (or propagation times) associated with the measured RX ultrasonic signals. The whitening of an ultrasonic signal (e.g., during the configuration process) to compute the matched reference signal as described in FIG. 6 and the whitening of a measured ultrasonic signal (e.g., during operation mode of the fluid flow meter 100) can reduce the effect of temperature variation associated with the fluid or the lumen structure on the measured signal and the matched reference signal and, therefore, lead to a more accurate and robust estimation of time shifts based on cross correlations between the measured ultrasonic signal and the matched reference signal. Accordingly, the fluid flow meter 100 can achieve improved accuracy in measuring (or estimating) fluid flow rate by using the whitening filter and matched reference signal described with regard to FIGS. 5 and 6.

Figure 7:
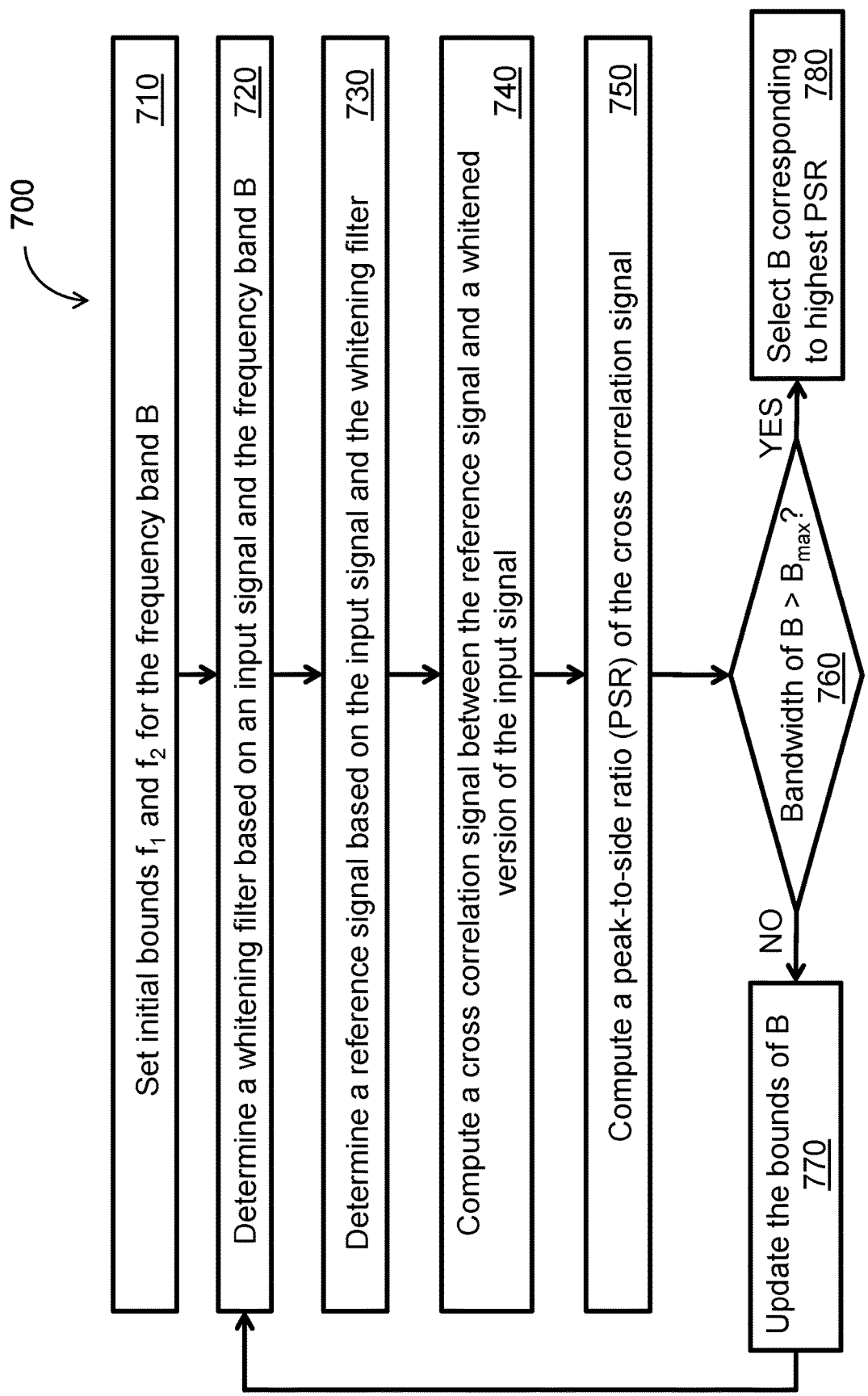
FIG. 7 shows a flow diagram illustrating a method of determining a whitening frequency band.

FIG. 7 shows a flow diagram illustrating a method 700 of determining a whitening frequency band B based on an input signal. The input signal can be associated with a corresponding RX signal received by a transducer. For instance, the input signal can be equal to the RX signal or can be a processed or filtered version of the RX signal. In some implementations, the RX signal can be a zero-flow RX signal. In a brief overview, the method 700 can include a processor (e.g., processor of computing device 90 or processor 151) setting initial frequency bounds $f_1$ and $f_2$ of the whitening frequency band B (step 710), determining a whitening filter based on the input signal and the frequency band B (step 720), determining a reference signal based on the input signal and the whitening filter (step 730), computing a cross correlation signal between the reference signal and a whitened version of the input signal (step 750) and computing a peak-to-sidelobe ratio (PSR) of the cross correlation signal (step 750). The method 700 can also include the processor comparing the bandwidth of the frequency band B to a threshold value (decision block 760). If the bandwidth of B exceeds the threshold value, the processor can increase the bandwidth of B by updating the respective frequency bounds $f_1$ and $f_2$ and loop back to step 720 (step 770). Otherwise, the processor can select the whitening frequency band B associated with the highest PSR.

The method 700 can include the processor setting initial bounds $f_1$ and $f_2$ for the whitening frequency band B. In some implementations, the processor can set $f_1$ and $f_1$ such that frequency band B defined as $[f_1,f_2]$ is a narrow band centered at a frequency $f_0$ at which the input signal (e.g., the RX signal or a respective processed/filtered version such as p[n] or p'[n] as discussed with regard to FIGS. 4A, 4B and 5) has the highest frequency response magnitude. For instance, the processor can compute $f_1$ and $f_1$ such that $f_1=f_0-d$ and $f_2=f_0+d$, where d is a number (e.g., d can be equal to 0.1 MHz, 0.2 MHz or other number). In some implementations, the processor can select the frequency bounds $f_1$ and $f_2$ such that the range $[f_1 f_2]$ is arranged at the center of the pass-band of the input signal The method 700 can include the processor determining a whitening filter based on the input signal and the frequency band B (step 720). The processor can compute the impulse of the whitening filter as discussed above with regard to FIG. 5. The processor can then determine a reference signal (or matched reference signal) based on the input signal and the whitening filter (step 730). In some implementations, the processor can compute samples of the reference signal as discussed above with regard to FIG. 6.

The method 700 can include the processor computing a cross correlation signal between the reference signal and a whitened version of the input signal (step 740). In some implementations, the processor can compute the cross correlation signal as discussed with regard to step 440 of FIGS. 4A and 4B. The processor can then compute a PSR of the cross correlation signal (step 750). The processor can compute the PSR by identifying the largest peak and the second largest peak in the cross correlation signal and dividing the amplitude of the largest peak by the amplitude of the second largest peak. In the method 700, the PSR is employed as a metric (or feature) for selecting or determining the whitening frequency band. The processor can be configured to store the computed PSR for each respective frequency band B. The processor can then compare the bandwidth of the whitening frequency band B to a threshold value (decision block 760). In some implementations, the threshold value can be selected to be equal to or larger than the maximum possible bandwidth of the transducers. For instance, the bandwidth threshold value can be equal to 1.5 MHz, 1.6 MHz or other bandwidth value. If the bandwidth of B is smaller than (or equal to) the bandwidth threshold value (decision block 760), the processor can increase the bandwidth of the frequency band B (step 770) and loop back to step 720. For instance, the processor can update the frequency bounds compute $f_1$ and $f_1$ such that $f_1$ is reduced by a value d ($f_1 \leftarrow f_1 \leftarrow d$) and $f_2$ is increased by the value d ($f_2 \leftarrow f_2+d$), therefore, increasing the bandwidth of B by $2d$. The processor can keep iterating through steps 720 through 770 until the bandwidth of B is determined (at decision block 760) to be greater than the bandwidth threshold value. If the bandwidth of B is greater than the bandwidth threshold value, the processor can select the whitening frequency band B associated with highest PSR (step 780) as the final whitening frequency band. In some implementations, the processor can also store the whitening filter and reference signal constructed at each frequency band B throughout the iteration of the method 700. The processor can select the whitening filter and reference signal associated with the highest PSR to be provided to the flow meter for use in measuring fluid flow rate (or flow velocity). If the whitening filters and reference signals measured during the iterations of the method 700, the processor can use the selected whitening frequency band to compute the final whitening filter (as discussed with regard to FIG. 5) and the final reference signal (as discussed with regard to FIG. 6).

In some implementations, the processor can determine the whitening frequency band B based on the frequency response of one or more RX signals (or measured signals). For instance, the processor can obtain one or more RX signals from the flow meter and compute the respective Fourier transform(s). Based on the computed Fourier transform(s), the processor can determine frequency bounds for B such that at least a given percentage (e.g., 99%, 98%, 97% or other percentage) of the energy of the RX signals falls within the frequency band B. In some implementations, the processor can select the whitening frequency B based on the transducers bandwidth. For instance, the processor can select whitening frequency band B that includes a passband of the transducers (e.g., 1.5 MHz to 2.5 MHz).

Figure 8A:
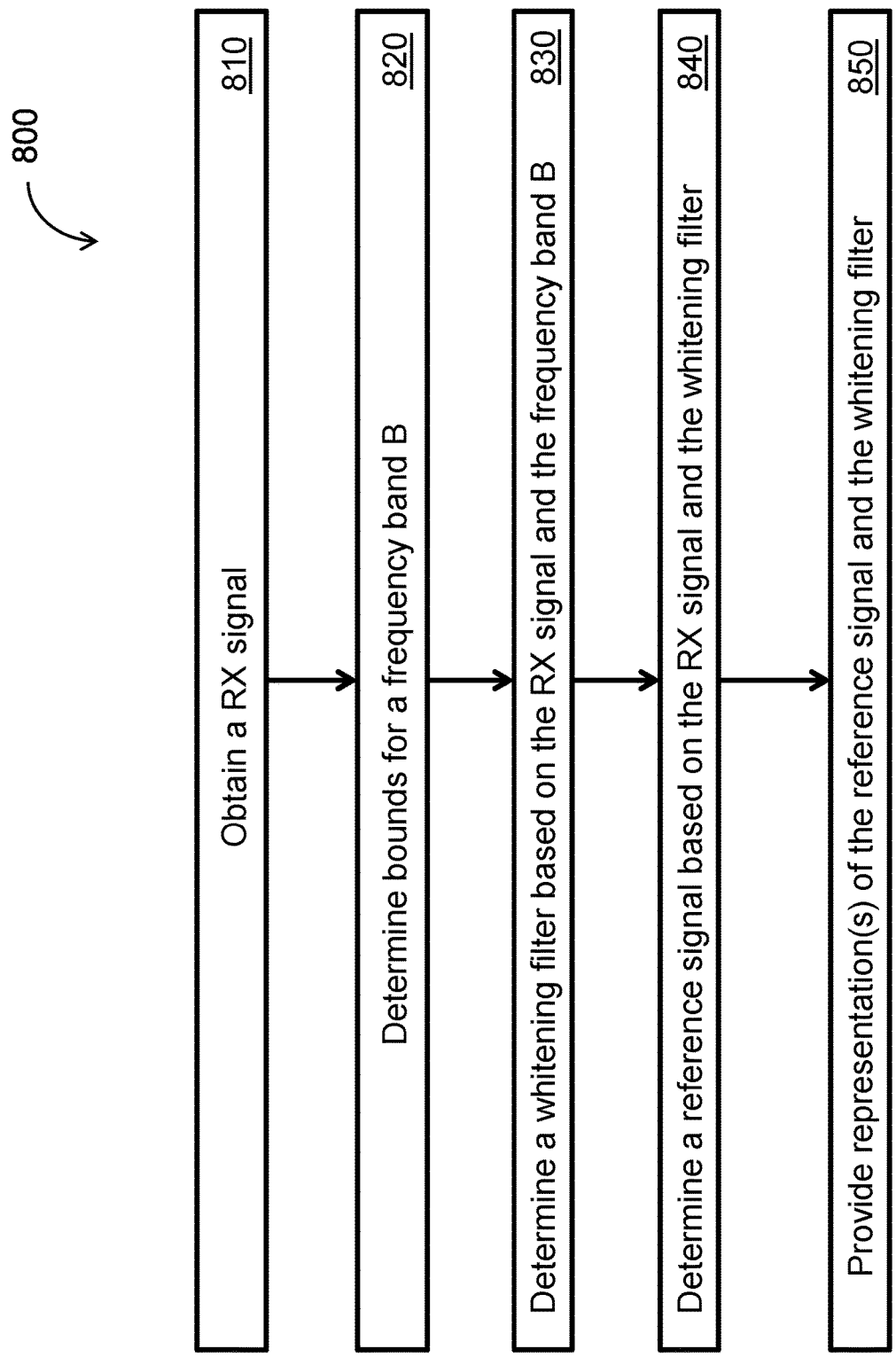
FIG. 8A shows a flow diagram of a configuration method for configuring a fluid flow meter.

FIG. 8A shows a flow diagram illustration a configuration method 800 for configuring a flow meter. The method 800 can be performed by a processor of the computer device 90 (or processor 151) executing the configuration application 95. In a brief overview, the method 800 can include obtaining or receiving an input signal associated with a respective RX signal (step 810), determining a whitening frequency band (step 820) determining a whitening filter based on the input signal and the whitening frequency band (step 830), determining a reference signal based on the input signal and the whitening filter (step 840) and providing indication(s) of the reference signal and the whitening filter to the fluid flow meter (step 850). The RX signal can be a zero-flow RX signal.

The configuration method 800 can include the configuration application 95 obtaining an input signal recorded by the fluid flow meter. The application 95 (if running on computer device 90) can initiate configuration of the fluid flow meter 100 by sending a request to the fluid flow meter 100. In some implementations, the configuration process can be initiated through a button of the fluid flow meter 100 (e.g., if the configuration application 95 is running on the processor 151 or the control circuit 150). Upon initiation of the configuration process, one transducer 110 of the fluid flow meter 100 can generate a transmit (TX) signal to propagate through the fluid in the lumen. In response to the TX signal, another transducer 110 of the fluid flow meter can receive a respective RX signal (or measurement signal). In some implementations, the TX and RX signals can be associated with a zero-flow state. In some implementations, the TX and RX signals can be upstream or downstream signals. The ADC 155 can sample the RX signal and provide the respective samples to the processor 151 or a memory of the fluid flow meter 100. The fluid flow meter 100 (or the processor 151) can provide the samples of the RX signal to the configuration application 95. In some implementations, the fluid flow meter 100 can provide a processed or filtered version of the RX signal.

The method 800 can include application 95 determining a whitening frequency band B (step 820). Determining the whitening frequency band B can include determining the respective frequency bounds (e.g., frequency values $f_1$ and $f_2$). In some implementations, the configuration application 95 can determine the whitening frequency band as discussed above with regard to FIG. 7. The method 800 can include the configuration application 95 determining a whitening filter based on the input signal and the frequency band B (step 830). The configuration application 95 can determine the whitening filter as discussed above with regard to FIGS. 5 and 7. The method 800 can include the configuration application 95 determining a reference signal based on the input signal and the whitening filter (step 840). The configuration application 95 can determine the reference signal as discussed above with regard to FIGS. 6 and 7. The configuration application 95 can then provide indication(s) (or representation(s)) of the whitening filter and the reference signal (determined at steps 830 and 840) to the fluid flow meter 100 (or the respective processor 151) for use in determining fluid flow rate or fluid flow velocity. For instance, if the configuration application 95 is running on a computer device 90 external to the fluid flow meter 100, the computer device 90 can send indication(s) of the whitening filter and the reference signal to the flow meter 100. If the configuration application 95 is running on processor 151, the configuration application 95 can store indication(s) of the whitening filter and the reference signal in a memory associated with the fluid flow meter 100. The fluid flow meter 100 can then employ the whitening filter and the reference signal to measure difference in signal propagation times for distinct signals (as discussed above with regard to FIGS. 2, 4A and 4B) during operational mode (i.e., post configuration) of the fluid flow meter 100.

Figure 8B:
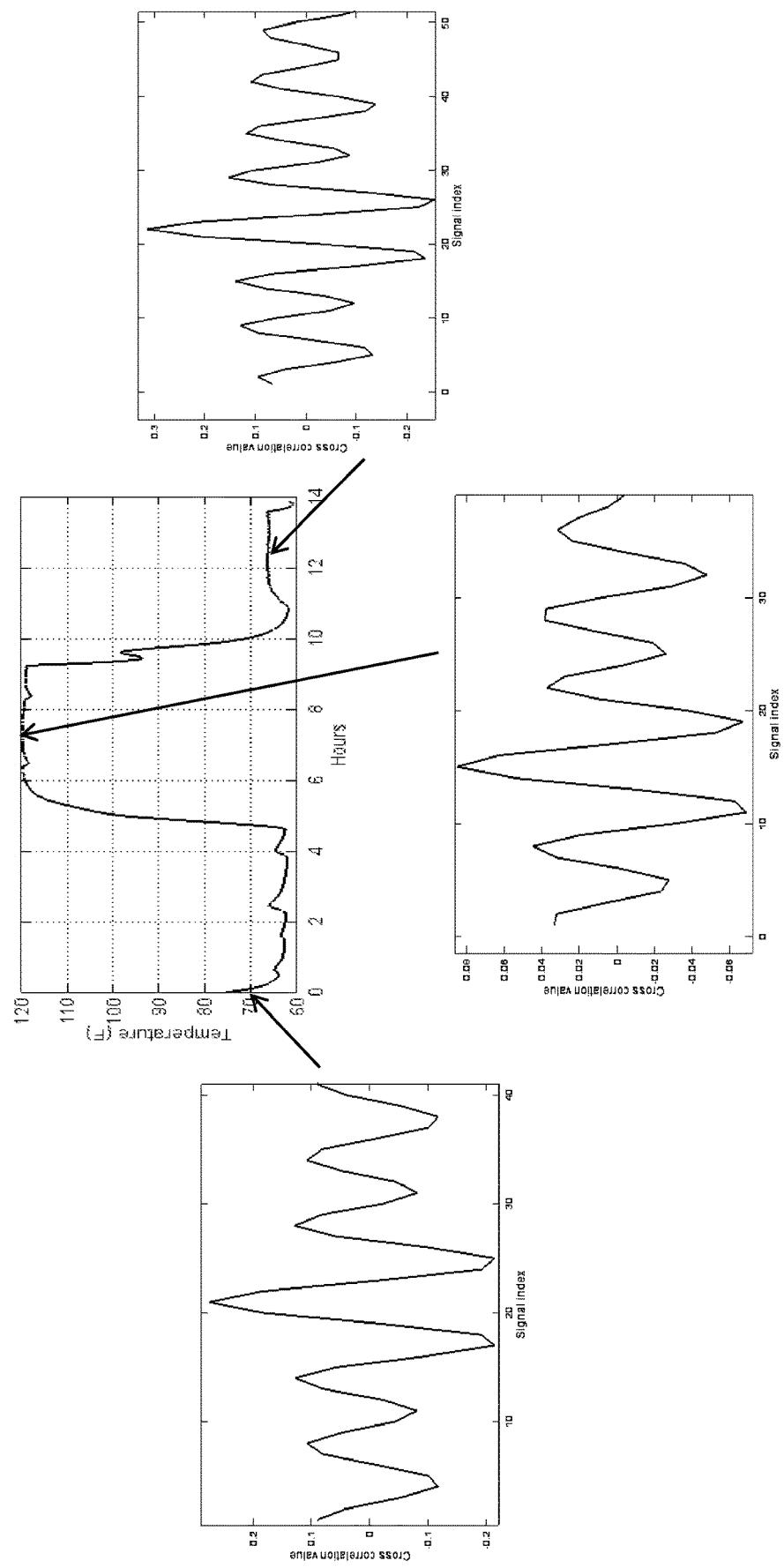
FIG. 8B shows plots of cross correlation signals computed according to the method(s) in FIGS. 4A and 4B and associated with different fluid temperatures.

FIG. 8B shows plots of cross correlation signals computed according to the method(s) in FIGS. 4A and 4B and associated with different fluid temperatures. The cross correlation signals are computed using a whitening filter and a reference signal that are constructed as discussed with regard to FIGS. 5, 6 and 7. Compared to the cross correlation signals in FIG. 3, each of the cross correlation signals in FIG. 8B exhibits (or includes) a respective global maximum (or peak) that is substantially different in magnitude (e.g., substantially greater in magnitude) compared to other local maxima of that cross correlation signal. As such, the global maximum in each of the cross correlation signals shown in FIG. 8B is distinguishable (or identifiable) over other local maxima in that cross correlation signal. Therefore, using a whitening filter and a reference signal constructed as discussed with regard to FIGS. 5, 6 and 7 allows for accurate estimation of time shifts between the reference signal and measurement signals (or RX signals).

In some implementations, the configuration application 95 can be configured to determine a time offset value for use in determining a segment (step 220 in FIG. 2) of the fine resolution signal. The configuration application 95 can obtain (or generate) a fine resolution signal associated with a respective measurement signal (or RX signal). The configuration application 95 can then select a local maximum, a local minimum or a zero-crossing of the fine resolution signal to be used, for example, as the center of the window determined in block 220 of FIG. 2. The configuration application 95 can use a time index associated with the selected local maximum, local minimum or zero-crossing as the time offset value. The configuration application 95 can provide the time offset value to the fluid flow meter 100 for use in estimating signal propagation times.

When estimating propagation time (e.g., during operation mode post configuration of the fluid flow meter 100) associated with a measured RX ultrasonic signal (such as an upstream, downstream ultrasonic signal, or respective processed version), the fluid flow meter 100 can filter the measured RX ultrasonic signal using the whitening filter. The fluid flow meter 100 can cross correlate the filtered measured RX ultrasonic signal with the matched reference signal to compute a cross correlation signal. The fluid flow meter 100 can determine a relative time shift (or a propagation time) associated with the measured RX ultrasonic signal based on, for example, a time index associated with a peak of the computed cross correlation signal.

Figure 9:
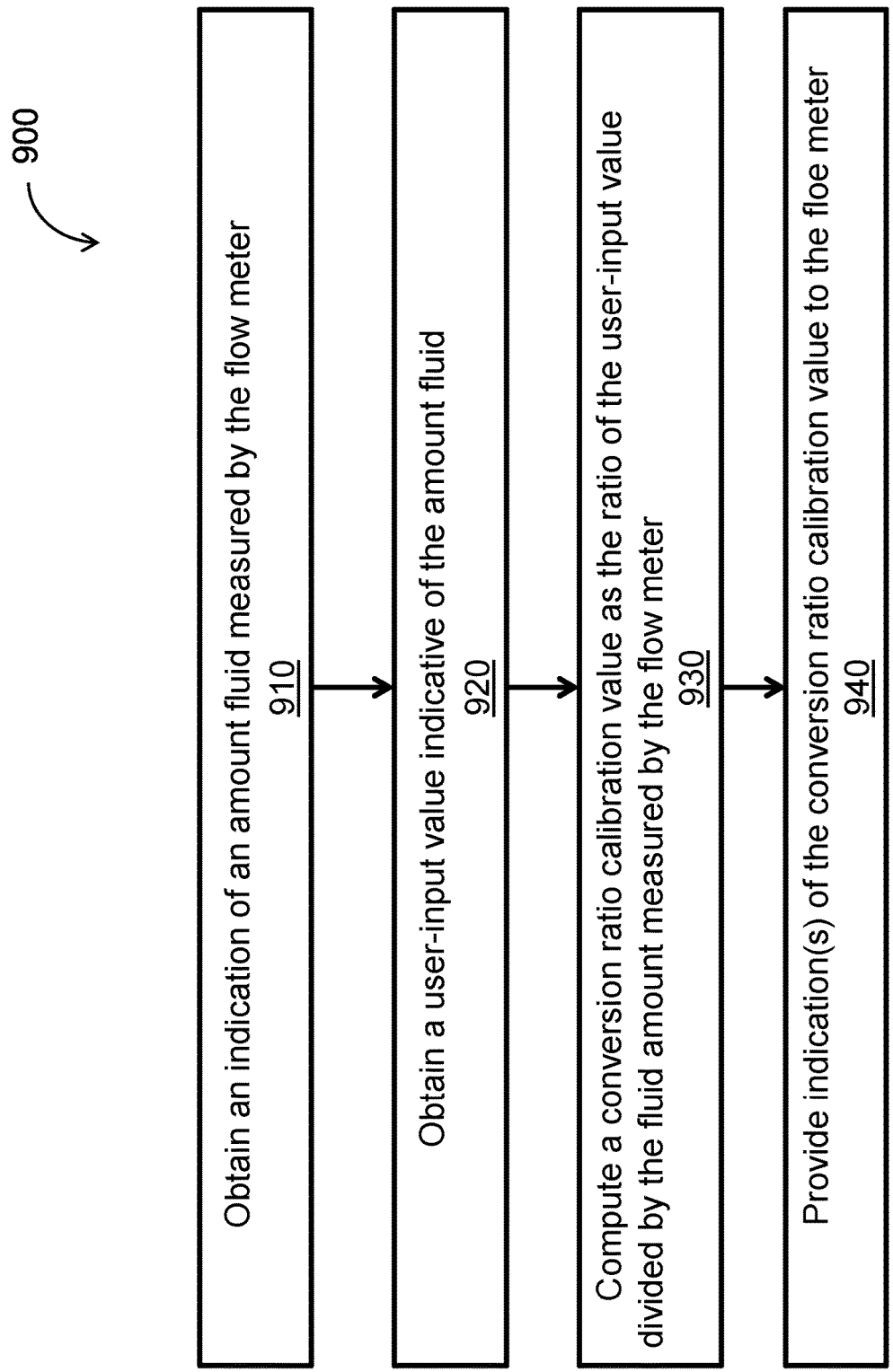
FIG. 9 is a flow diagram illustrating a method of calibrating a fluid flow meter.

FIG. 9 is a flow diagram illustrating a method 900 of calibrating a fluid flow meter. Calibrating the fluid flow meter can include calibrating a conversion ratio employed by the fluid flow meter to map a measured difference in propagation times for distinct measurement signals to a fluid flow rate (or fluid flow velocity) value indicative of the fluid flow rate (or fluid flow velocity) of the fluid in the lumen. The method 900 can include a processor (such as a processor of the computer device 90 or processor 151) obtaining a meter measured value indicative of an amount of fluid measured by the fluid flow meter (step 910). For instance, a user can cause fluid to be driven (e.g., by opening a faucet) through the lumen on which the fluid flow meter is installed. The user can use a bucket to collect the amount of fluid flowing out from the faucet. The fluid flow meter 100 can measure the amount of fluid flowing through the lumen (e.g., by integrating fluid flow rate values measured over time during which the fluid is flowing). In some implementations, the calibration process 900 can be performed after configuring the fluid flow meter 100 as discusses with regard to FIGS. 5-8. The processor can obtain the meter measured value of the fluid amount from the fluid flow meter 100.

The method 900 can include the processor obtaining a user measured value of the fluid amount flowing through the lumen (step 920). For instance the user can measure the amount of fluid collected in the bucket and input the measured value (e.g., through a user interface (UI) of the computer device 90 or a UI the flow meter 100). The processor can then compute a conversion ratio calibration value as the ratio of the user measured value divided by the meter measured value (step 930). The processor can then provide the conversion ratio calibration value to the fluid flow meter 100 (step 940). The fluid flow meter 100 (or processor 151) can then calibrate a conversion ratio (maintained by the flow meter) by multiplying the conversion ratio with the calibration value. The processor 151 can use the calibrated conversion ration to map measured differences in signal propagation times (between distinct measurement signals) to respective flow rate values.

While the systems, devices and methods in the current disclosure are described in terms of ultrasonic transducers, alternative flow rate sensors can include magnetic field sensors acoustic sensors or other sensors capable of sensing other types of signals propagating through a fluid in a lumen. The systems, devices and methods described in the current disclosure can be used to measure flow rates in fluid distribution systems such as water distribution systems, natural gas distribution systems, oil distribution systems, or other fluid distribution systems used in different industries.

Methods described in this disclosure can be implemented as computer code instructions. For example, a computer-readable medium can include computer code instructions stored thereon. The computer code instructions when executed by a processor cause the processor to execute any of the methods described above.

While the invention has been particularly shown and described with reference to specific embodiments, it should be understood by those skilled in the art that various changes in form and detail may be made therein without departing from the spirit and scope of the invention as defined by the following claims.

What is claimed is:

1. A system for configuring an ultrasonic fluid flow meter comprising:
one or more computers; and
one or more memories storing computer executable instructions thereon, the computer executable instructions when executed by the one or more computers cause the one or more computers to:
receive an input signal indicative of a measurement signal recorded by the ultrasonic fluid flow meter mounted on a structure defining a lumen, the measurement signal representing an ultrasonic signal propagating through fluid flowing in the lumen;
determine a whitening frequency band based on the input signal;
construct a whitening filter having a whitening filter Fourier transform, the whitening filter Fourier transform of the whitening filter inversely proportional to a magnitude of an input signal Fourier transform of the input signal, wherein the whitening filter Fourier Transform is within the whitening frequency band;
generate a reference signal by filtering the input signal using the whitening filter; and
provide representations of the whitening filter and the reference signal to the fluid flow meter for use in estimating fluid flow rates based on ultrasonic signals measured by the fluid flow meter, the fluid flow meter configured to filter a measured ultrasonic signal using the whitening filter and cross correlate the filtered ultrasonic signal with the reference signal to estimate a time shift associated with the measured ultrasonic signal.

2. The system of claim 1, wherein the input signal includes the measurement signal or a filtered version of the measurement signal.

3. The system of claim 1, wherein determining the whitening frequency band based on the input signal includes:
for each of a plurality of candidate whitening frequency bands,
determining a candidate whitening filter based on the input signal and the candidate whitening frequency band;
generating a candidate reference signal by filtering the input signal with the candidate whitening filter;
computing a candidate cross correlation signal representing cross correlation between the candidate reference signal and a version of the input signal filtered using the candidate whitening filter; and
computing a candidate peak to sidelobe ratio (PSR) using the candidate cross correlation signal; and
selecting, among the plurality of candidate whitening frequency bands, a candidate whitening frequency band associated with the largest PSR.

4. The system of claim 1, wherein constructing the whitening filter includes:
computing the input signal Fourier transform of the input signal; and
computing the whitening filter Fourier transform of the whitening filter as a function of the inverse of the magnitude of the input signal Fourier transform of the input signal within the whitening frequency band.

5. The system of claim 4, wherein constructing the whitening filter further includes:
computing an impulse response of the whitening filter by computing an inverse Fourier transform of the whitening filter Fourier transform of the whitening filter; and
truncating the impulse response of the whitening filter.

6. The system of claim 4, wherein constructing the whitening filter further includes applying a windowing operation to the input signal prior to computing the input signal Fourier transform of the input signal.

7. The system of claim 6, wherein the windowing operation includes using a Hamming window or a Hanning window.

8. The system of claim 1, wherein the measurement signal is a zero-flow measurement signal that is associated with a zero-flow state of the fluid in the lumen.

9. The system of claim 1, wherein the computer executable instructions when executed by the one or more computers further cause the one or more computers to:
receive a first value indicative of an amount of fluid flowing through the lumen, the first value measured by the fluid flow meter;
receive as input a second value indicative of the amount of fluid flowing through the lumen measured by a user of the fluid flow meter;
compute a calibration value by dividing the second value by the first value; and
provide the calibration value to the fluid flow meter to calibrate a conversion ratio by multiplying the conversion ratio with the calibration value, the fluid flow meter using the calibrated conversion ratio to map a measured time difference between signal propagation times to a respective fluid flow rate value.

10. The system of claim 1 comprising a computer device communicatively coupled to the fluid flow meter.

11. A method of configuring ultrasonic fluid flow meters comprising:
receiving, by one or more computers, an input signal indicative of a measurement signal recorded by an ultrasonic fluid flow meter mounted on a structure defining a lumen, the measurement signal representing an ultrasonic signal propagating through fluid flowing in the lumen;
determining, by the one or more computers, a whitening frequency band based on the input signal;
constructing, by the one or more computers, a whitening filter having a whitening filter Fourier transform, the whitening filter Fourier transform of the whitening filter inversely proportional to a magnitude of an input signal Fourier transform of the input signal, wherein the whitening filter Fourier Transform is within the whitening frequency band;
generating, by the one or more computers, a reference signal by filtering the input signal using the whitening filter; and
providing, by the one or more computers, representations of the whitening filter and the reference signal to the fluid flow meter for use in estimating fluid flow rates based on ultrasonic signals measured by the fluid flow meter, the fluid flow meter configured to filter a measured ultrasonic signal using the whitening filter and cross correlate the filtered ultrasonic signal with the reference signal to estimate a time shift associated with the measured ultrasonic signal.

12. The method of claim 11, wherein the input signal includes the measurement signal or a filtered version of the measurement signal.

13. The method of claim 11, wherein determining the whitening frequency band based on the input signal includes:
for each of a plurality of candidate whitening frequency bands, determining a candidate whitening filter based on the input signal and the candidate whitening frequency band;

generating a candidate reference signal by filtering the input signal with the candidate whitening filter;

computing a candidate cross correlation signal representing cross correlation between the candidate reference signal and a version of the input signal filtered using the candidate whitening filter; and computing a candidate peak to sidelobe ratio (PSR) using the candidate cross correlation signal; and selecting, among the plurality of candidate whitening frequency bands, a candidate whitening frequency band associated with the largest PSR.

14. The method of claim 11, wherein constructing the whitening filter includes:

computing the input signal Fourier transform of the input signal; and computing the whitening filter Fourier transform of the whitening filter as a function of an inverse of the magnitude of the input signal Fourier transform of the input signal within the whitening frequency band.

15. The method of claim 14, wherein constructing the whitening filter further includes:

computing an impulse response of the whitening filter by computing an inverse Fourier transform of the whitening filter Fourier transform of the whitening filter; and truncating the computed impulse response of the whitening filter.

16. The method of claim 14, wherein constructing the whitening filter includes applying a windowing operation to the input signal prior to computing the input signal Fourier transform of the input signal.

17. The method of claim 16, wherein the windowing operation includes using a Hamming window or a Hanning window.

18. The method of claim 11, wherein the measurement signal is a zero-flow measurement signal that is associated with a zero-flow state of the fluid in the lumen.

19. The method of claim 11 further comprising:

receiving, by the one or more computers, a first value indicative of an amount of fluid flowing through the lumen, the first value measured by the fluid flow meter;

receiving, by the one or more computers, as input a second value indicative of the amount of fluid flowing through the lumen measured by a user of the fluid flow meter;

computing, by the one or more computers, a calibration value by dividing the second value by the first value; and providing, by the one or more computers, the calibration value to the fluid flow meter to calibrate a conversion ratio by multiplying the conversion ratio with the calibration value, the fluid flow meter using the calibrated conversion ratio to map a measured time difference between signal propagation times to a respective fluid flow rate value.

20. A non-transitory computer-readable medium including computer code instructions stored thereon, the computer code instructions when executed by a one or more computers cause the one or more computers to:

receive an input signal indicative of a measurement signal recorded by an ultrasonic fluid flow meter mounted on a structure defining a lumen, the measurement signal representing an ultrasonic signal propagating through fluid flowing in the lumen;

determine a whitening frequency band based on the input signal;

construct a whitening filter having a whitening filter Fourier transform, the whitening filter Fourier transform of the whitening filter inversely proportional to a magnitude of an input signal Fourier transform of the input signal, wherein the whitening filter Fourier Transform is within the whitening frequency band;

generate a reference signal by filtering the input signal using the whitening filter; and provide representations of the whitening filter and the reference signal to the fluid flow meter for use in estimating fluid flow rates based on ultrasonic signals measured by the fluid flow meter, the fluid flow meter configured to filter a measured ultrasonic signal using the whitening filter and cross correlate the filtered ultrasonic signal with the reference signal to estimate a time shift associated with the measured ultrasonic signal.

* * * * *

UNITED STATES PATENT AND TRADEMARK OFFICE
CERTIFICATE OF CORRECTION

| | |
|---|---|
| PATENT NO. | : 11,243,105 B2 |
| APPLICATION NO. | : 15/531332 |
| DATED | : February 8, 2022 |
| INVENTOR(S) | : Brian Gestner, Francis M. Mess and Jeffrey L. Leaders |

It is certified that error appears in the above-identified patent and that said Letters Patent is hereby corrected as shown below:

In the Claims

Column 22, Line 17, Claim 20, delete "a one" and insert -- one --.

Signed and Sealed this
Twenty-fourth Day of May, 2022

Katherine Kelly Vidal
*Director of the United States Patent and Trademark Office*